United States Patent
Bansemir (10) Patent No.: US 6,361,278 B2
(45) Date of Patent: Mar. 26, 2002

(54) COUPLING MEMBRANE FOR A HELICOPTER ROTOR HEAD

(75) Inventor: Horst Bansemir, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/738,222

(22) Filed: Dec. 15, 2000

(30) Foreign Application Priority Data

Dec. 17, 1999 (DE) .......................................... 199 61 071

(51) Int. Cl.[7] .............................................. B64C 27/32
(52) U.S. Cl. ................................ 416/134 A; 416/244 R
(58) Field of Search ........................... 416/134 A, 141, 416/140, 244 R, 244 D (56) References Cited

U.S. PATENT DOCUMENTS 3,988,074 A * 10/1976 Kenigsberg et al. ........ 416/144

* cited by examiner

Primary Examiner—Edward K. Look
Assistant Examiner—James McAleenan
(74) Attorney, Agent, or Firm—W. F. Fasse; W. G. Fasse (57) ABSTRACT

A helicopter gimbal rotor arrangement includes a drive shaft with a rotor hub, a rotor blade holder arrangement, and a coupling membrane for transmitting the rotational drive moment from the rotor hub to the rotor blade holder arrangement. The coupling membrane includes a plate element made up of a plurality of concentric rings that are spaced apart radially by annular gaps and are connected to each other by respective connecting webs spanning across the gaps. This plate element as the coupling membrane provides torsional stiffness combined with bending flexibility to allow tilting motions of the rotor blade holder arrangement relative to the rotor hub. Plural plate elements connected in parallel provide a redundant fail-safe arrangement, while plural plate elements connected in series achieve increased flexibility for out-of-plane tilting.

19 Claims, 5 Drawing Sheets

COUPLING MEMBRANE FOR A HELICOPTER ROTOR HEAD

PRIORITY CLAIM

This application is based on and claims the priority under 35 U.S.C. §119 of German Patent Application 199 61 071.1, filed on Dec. 17, 1999, the entire disclosure of which is incorporated herein by reference.

FIELD OF THE INVENTION

The invention relates to a coupling membrane for transmitting a rotational moment between a drive shaft hub and a rotor blade holder, especially in a gimbal rotor of a helicopter. The rotor blade holder carries plural rotor blades extending respectively radially relative to the rotation axis so as to thereby form a rotor blade plane. Bearings connecting the rotor blade holder to the drive shaft allow the holder to tilt relative to the shaft, while the center lines of the bearing arrangement between the holder and the hub intersect each other on the axis of the drive shaft.

BACKGROUND INFORMATION

In general, various couplings are used for transmitting rotational moments to or from rotating components including drive shafts. The present application particularly relates to a so-called membrane coupling arranged between a drive shaft and plural rotor blades that are positioned radially about the drive shaft. The membrane coupling uses a membrane as the coupling element, i.e. a so-called coupling membrane. The rotor blades are rotatably arranged in a rotational plane, and the coupling membrane is arranged between the rotor hub of the rotor shaft and the holder structure that holds the rotor blades. Such a coupling membrane is especially applicable in technical structures in which the rotor blade plane must be tiltable relative to the rotational axis of the rotor shaft. Thus, the coupling membrane must be able to allow and follow this tilting motion of the rotor blade plane while still transmitting the rotational moment from the shaft to the rotor blades. A particular application in the field of helicopter technology is the generally known gimbal rotor also called a Cardan rotor.

Such a generally known gimbal rotor is used in a rotary wing aircraft, for example, and particularly in a helicopter. However, other applications for such a gimbal rotor arrangement include machine constructions in which a rotating shaft must be provided with an elastic compensating coupling that transmits a rotational moment while allowing axial relative motion. For example, any application in which a rotating drive shaft drives rotating rotor blades in which tilting of the blade plane is to be enabled can use such a gimbal rotor.

The development of the gimbal rotor was especially motivated and driven in the field of helicopter technology by the on-going need to reduce or avoid the vibrations resulting from various rotor blade movements. First of all, an up and down cyclical or oscillating movement of each rotor blade takes place due to the different relative wind velocities as well as the cyclical blade pitch adjustments as each blade travels around a full circle. Further caused by the change of the rotor radius, the coriolis forces arising in this context in turn lead to a lead-lag pivoting or oscillation of each blade. These horizontal lead-lag motions as well as the known vertical flapping motions of the blades, which are both generally categorized as bending motions, generate vibrations that are conducted through the rotor head into the drive train and the fuselage construction. As a result, these vibrations influence not only the rotor construction itself, but also the entire fuselage construction.

The gimbal rotor provides the advantage in comparison to other rotors, that it significantly reduces or prevents the vibrations that arise due to the flapping and lead-lag oscillating of the rotor blades. This can be achieved because the individual flapping of the rotor blades is prevented and thus the resulting lead-lag oscillation of each blade is reduced or minimized. The gimbal rotor is one step in the direction toward a rotor that enables a tilting motion of the entire rotor blade plane relative to the drive shaft. A component that is necessary for the functioning of the gimbal rotor is the coupling membrane, which is subjected to extreme dynamic loads, which result from the double function of the coupling membrane. On the one hand, the rotational drive moment must be transmitted from the rotor mast to the rotor blades, and this requires a torsionally stiff and torsionally strong and rigid behavior of the coupling membrane. On the other hand, the tilting movements of the rotor must be enabled and followed while still maintaining the power transmitting connection between the mast and the rotor blades. This requires a relatively soft stiffness or flexibility characteristic of the coupling membrane with respect to the tilting movements of the rotor.

The above mentioned dynamic loads arising from the disparate functions, in effect, require diametrically opposed construction requirements for the coupling membrane. The necessary bending softness with respect to tilting movements of the rotor requires the coupling membrane to have a relatively small cross-section with relatively little material, which would, however, negatively influence the torsional stiffness, rigidity and strength that is also required of the coupling membrane. The coupling membranes that are known in the prior art suffer very rapid wear and degradation due to the strong dynamic loads. Especially the loads resulting from the transmission of the rotational moment lead to a relatively rapid material fatigue in the known coupling membrane constructions. Through the use of fiber reinforced composite materials, the operating life of known coupling membranes could be increased in an economical manner, but there is still room for improvement, especially in relation to the structure and configuration of the coupling membrane rather than the material of the coupling membrane.

In known rotor constructions, coupling membranes may have a convex and/or concave configuration and especially a complex dual convex and concave curvature. A disadvantage of such a structural configuration is that the double curvature of the surface of the coupling membrane causes difficulties in the fabrication thereof, and places limits on the use of fiber reinforced composite materials for making such coupling membranes. Moreover, such known concave and/or convex coupling membranes are not constructed in a fault tolerant or damage tolerant manner, so that a fault or damage of the coupling membrane may lead to a complete failure of the coupling arrangement.

It is also known to provide a gimbal rotor using a concave coupling membrane together with elastomeric transverse force or shear force bearings for a four-bladed rotor. The known concave coupling membrane in this context has a form similar to a V-belt pulley with a deep V-groove. The coupling membrane has a massive solid construction in order to achieve a sufficient torsional stiffness, rigidity and strength for transmitting the drive moment. That, however, is not particularly advantageous for achieving a bending softness or flexibility for the purpose of enabling, receiving, and transmitting bending moments arising from the movements of the rotor blades. Moreover, this known coupling membrane is not constructed in a redundant fashion, and does not provide fault or damage tolerance, so that upon the failure of the coupling membrane, no further drive of the rotor is possible.

SUMMARY OF THE INVENTION

In view of the above, it is an object of the invention to improve a gimbal rotor arrangement for transmitting the rotational drive moment from the rotor shaft to the rotor blades while achieving an improved bending elasticity and also providing failure reliability or tolerance. It is a further particular object of the invention to provide a configuration and construction of a coupling membrane that achieves a high torsional stiffness, rigidity and strength, in combination with a high bending flexibility for tilting relative to the rotor axis, with a simple and economical structure and fabrication thereof. The invention further aims to avoid or overcome the disadvantages of the prior art, and to achieve additional advantages, as apparent from the present specification.

The above objects have been achieved in an arrangement for transmitting a rotational moment between a drive shaft and plural rotor blades, especially in a gimbal rotor arrangement of a helicopter. The principle component of the arrangement is a coupling membrane arranged between the hub of the drive shaft and the rotor blade holder that carries the rotor blades extending radially relative to the rotation axis of the drive shaft. A bearing arrangement secures the rotor blade holder to the drive shaft in such a manner to allow tilting of the holder relative to the shaft, whereby the center lines of the bearing arrangement intersect at an intersection point on the rotation axis of the drive shaft.

Especially according to the invention, the coupling membrane comprises at least one plate-shaped element comprising a plurality of rings that are respectively arranged concentrically about a center point of the plate-shaped element. Throughout this specification, the term "plate-shaped element" refers to an element having length and width dimensions in a major plane of the element that are substantially greater than the thickness of the element in a direction perpendicular to the major plane. For example, the length and width or lateral dimensions are at least 20 times the thickness dimension, or even significantly greater. Respective annular gaps are provided between the successive adjacent concentric rings, and the respective adjacent or neighboring rings are connected to each other by plural connector webs spanning across the annular gaps. According to one particular embodiment of the invention, each connecting web of a respective annular gap is displaced or offset in a circumferential direction relative to the respective connecting webs of the adjacent annular gap.

The rings may advantageously be circular or circular-arc-shaped, or be polygon-shaped. The rings may advantageously be arranged on a single plane, but it is also possible to arrange the rings on respective different planes, i.e. offset from one another on several planes. The plate-shaped element has an essentially constant and uniform thickness for all of the rings, while the respective rings may have different widths, although advantageously all the rings can have the same width. Any known securing means such as bolts, screws, pins, and the like can be used to secure the plate-shaped element to the rotor hub and to the rotor blade holder.

An advantageous grid-like structure of the plate-shaped element is achieved by arranging all of the connecting webs of a given annular gap respectively in pairs in such a manner so that respectively two paired connecting webs of a given annular gap together form a tapered or wedge-shaped V-configuration of the webs enclosing a vertex angle therebetween. Furthermore, each V-shaped or tapered pair of connecting webs of a given annular gap is arranged aligned along a radial line with a V-shaped or tapered pair of connecting webs of another one of the annular gaps. This arrangement provides a symmetry of the grid-like structure of the plate-shaped element. This embodiment is especially advantageous because it optimally takes up and transmits the forces acting on the plate-shaped element.

In an embodiment diverging from the above described embodiment, the plate-shaped element comprises at least three plate-segments that are circumferentially spaced by 120° from each other along radial directions. Within a respective one of the plate segments, respectively one pair of connecting webs in a given annular gap is arranged aligned in a radial row or along a radial line with a pair of connecting webs of a different annular gap.

According to a further feature of the invention, it is possible to arrange two plate-shaped elements coaxially spaced apart from one another, so that these plate-shaped elements form respective parallel arranged coupling membranes. The two plate-shaped elements, i.e. the two coupling membranes, are connected, for example, between the radially outermost rings and between the radially innermost rings of the coupling membranes. In this manner, a failure-tolerant or fail-safe, reliable construction of the coupling membrane is achieved. The respective plate-shaped elements arranged parallel to each other may respectively each be plate-shaped elements that are not isotropic or quasi-isotropic in their structure. Rather, it is simply important that the overall arrangement of the plural plate-shaped elements together with each other is carried out in such a manner that the sum or total effect of the several plate-shaped elements forms a quasi-isotropic plate stack, i.e. a coupling arrangement that provides uniform stiffness characteristics around its entire circumference when the stack of plates is considered as a whole.

With respect to the bending flexibility, the present inventive coupling membrane has achieved a surfacially extending, plate-shaped, structurally integratable elastic (fictitious) bending joint that provides the necessary bending flexibility. The invention is able to achieve and satisfy the respective opposing requirements of a soft bending flexibility combined with a torsional and transverse or shear stiffness in a one-piece or integral plate as a coupling membrane. Furthermore, the configuration of a torsionally stiff and strong, yet also flexibly elastic plate having an advantageous grid-like pattern, further provides the possibility of a fault tolerant and damage tolerant arrangement of the coupling membrane or plate-shaped element in the rotor arrangement. A further advantage is the simple fabrication of a simple planar plate-shaped element. Also, the plate-shaped element achieves an improved strength.

As described above, the coupling membrane is formed from at least one plate-shaped element, but may include a plurality of plate-shaped elements to achieve a redundancy and failure tolerance. For the sake of simplicity, the plate-shaped element will also simply be referred to as a plate herein, or generally also as a coupling membrane. That makes sense, because the plate-shaped element or the plate is used as the coupling element, i.e. the coupling membrane. Generally, the plate-shaped element represents a surfacially extending plate, with openings that penetrate through the thickness of the material of the plate between the upper surface and the lower surface thereof. Thus, the plate is given a grid-like structure. Alternatively, however, the plate could be embodied only to have individual plate segments formed therein.

The present inventive plate as a coupling membrane provides a significant structural improvement in comparison to the above described conventional concave membranes. The inventive plate is stiff in the major plane of the plate, yet flexibly bendable in directions out of that major plane. Thus, the plate represents a rotationally stiff compensating coupling. The present plate does not have a complex double curvature as do the known concave membranes, so that the present inventive plate may readily be fabricated in an economical manner using fiber reinforced composite materials built up by fiberglass layers or plies. The fiber reinforced composite material is especially embodied in a failure tolerant and reliable manner by using carbon fiber layers or plies in addition to glass fiber layers or plies. Alternatively, the present plate may be fabricated of metal, completely instead of fiber reinforced composite material, or in addition to one or more layers of fiber reinforced composite material, whereby the fabrication using metal is also simplified.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED
EXAMPLE EMBODIMENTS AND OF THE
BEST MODE OF THE INVENTION

Figure 1:
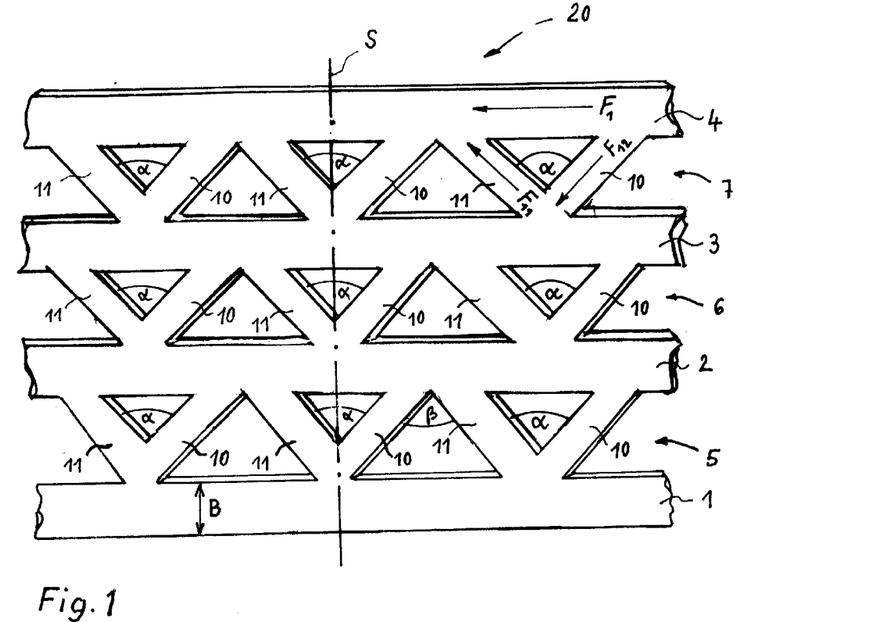
FIG. 1 is a schematic perspective view of a small portion near the rim of a plate-shaped element as a coupling membrane according to a first embodiment of the invention.

FIG. 1 schematically shows a small portion of the rim or edge area of a plate-shaped element 20 according to the invention. It should be understood that the entire plate-shaped element 20 may be embodied uniformly with the pattern or arrangement shown in the illustrated portion thereof in FIG. 1, i.e. this pattern or structure is repeated uniformly over the entire plate-shaped element 20. This plate-shaped element 20 comprises plural rings 1, 2, 3, 4 which may be arcuately curved and particularly in the form of a circular arc, or may be linearly shaped as the respective edges extending from corner to corner of a polygon. The number of rings is also selectable as needed. The rings may advantageously be arranged on a single plane, but alternatively they may be offset or displaced from one another in a direction in respective different planes.

In the present illustrated example, the plate-shaped element 20 includes four rings 1, 2, 3 and 4 arranged in a single plane, whereby each of the rings extends substantially linearly along the edges of a polygon. The radially innermost ring 1, also called the inner boundary ring 1, is arranged closest to the rotational axis of the rotor shaft. Progressing radially outwardly from the rotation axis, next comes an intermediate ring 2, a further intermediate ring 3, and a radially outermost boundary ring 4. The successive rings 1, 2, 3 and 4 are respectively radially spaced from one another by annular gaps 5, 6 and 7 which generally ensure a constant spacing distance between the individually successive rings, 1, 2, 3 and 4.

In the present example embodiment, each of the rings 1, 2, 3 and 4 has the same width B in the radial direction. As an alternative, the several rings 1, 2, 3 and 4 may have different widths in the radial direction. Radially inner rings have a shorter circumference and are thus stiffer with respect to bending. For this reason, the inner rings can have a smaller radial width in comparison to radially outer rings to achieve the same stiffness for each ring, and an isotropic or uniform stiffness profile over the entire plate element 20. The choice of the width B for each ring, and the other configuration details of each ring, are selectable depending on the degree of loading of the plate-shaped element 20 as well as the overall dimensions thereof.

The inner boundary ring 1 is connected to the next ring 2 by a plurality of pairs of two connecting webs 10 and 11. The two connecting webs 10 and 11 of each pair are oriented to form the two legs of a V while enclosing a vertex angle α therebetween. The second ring 2 then closes the broad open side of each pair of V-shaped connecting webs 10 and 11 to form a closed triangle with a vertex angle α. Particularly, the connecting webs 10 and 11 of each pair respectively both have the same length and are symmetrically arranged to form an isosceles triangle together with the adjoining second intermediate ring 2. A further alternative is the non-symmetrical arrangement of the webs 10 and 11, e. g. whereby the webs 10 and 11 of each pair do not have the same length and are not symmetrically arranged. Such an embodiment is generally not as advantageous as the symmetrical arrangement described above, but can be desired for particular force transmission needs.

Respective arrows in FIG. 1 represent general forces that will be effective in the structure of the plate-shaped element 20. Particularly, a rotational moment force $F_1$ effective in the outer boundary ring 4 is divided into partial forces or force components $F_{11}$ and $F_{12}$ through the two webs 10 and 11 of a respective web pair. The force $F_1$ of the rotational moment is divided in this manner several times corresponding to the number of the triangles provided by the connecting web pairs, whereby each connecting web pair will divide the circumferential force into a tension force component $F_{11}$ in one web and a compression force component $F_{12}$ in the other web of each pair due to the angled arrangement of the webs. These forces are optimally taken up and transmitted by the plurality of connecting webs 10 and 11. A typical shearing effect on an individual connecting web is thereby considerably reduced, and a high lateral or transverse shear thrust stiffness is achieved.

In the arrangement shown in FIG. 1, each connecting web pair extending radially outwardly from the ring 1 directly adjoins the adjacent web pair without a space therebetween, where the respective webs 10 and 11 are connected to the second intermediate ring 2. Thus, an endless zig-zag arrangement of successive web pairs 10 and 11 is arranged in the annular gap 5, whereby each of the respective web pairs 10, 11 has the same vertex angle α, while forming respectively the same neighboring angle β relative to the neighboring web pair 10, 11 on the side of the intermediate ring 2. In other words, the apex angles α open radially outwardly away from the rotation axis, while the neighboring angles β open radially inwardly toward the rotation axis. In the illustrated example of FIG. 1, in which the rings 1, 2, 3 and 4 extend along parallel straight lines, the vertex angles α are equal to the neighboring angle β, but this does not need to be the case. For example in embodiments in which the rings are circular arcs or the like, the vertex angles α will not be equal to the neighboring angles β.

The arrangement of immediately adjoining web pairs 10, 11 as shown in FIG. 1, with the vertex angles opening radially outwardly, is a preferred space-saving arrangement, especially along the circumference of the inner boundary ring 1. However, it is not a limitation of the invention, and instead the web pairs may be spaced circumferentially apart from one another, or each web pair may be arranged so that the apex angle α opens radially inwardly toward the rotation axis. Such an arrangement, however, is not as advantageous in view of the limited space available along the circumference of the inner boundary ring 1.

The above described arrangement of web pairs 10 and 11 in the annular gap 5 is repeated and continued with respective additional web pairs 10 and 11 in the annular gaps 6 and 7. Advantageously, the successive pairs of connecting webs 10 and 11 each having the same length and being symmetrically arranged about an apex angle α, respectively in the successive gaps 6 and 7, are preferably aligned along and symmetrically arranged relative to a radial line or direction S of the plate-shaped element 20. It should be understood that references to the "radial" direction, the "circumferential" direction, the "annular" gaps, and the like, in the context of a polygon-shaped plate element 20 of course do not refer to circular structures and a true axial centerpoint with radial lines emanating therefrom, but rather refer to analogous concepts as applied to a polygon rather than to a circular structure.

The above described grid-like shape of the plate element 20 allows for an economic fabrication thereof. The openings may be stamped or otherwise cut out of a solid starting plate, or the plate may be originally formed in a grid-like shape. Moreover, the plate element 20 having such a grid-like structure is an advantageous surfacially extending structure that is easily incorporated into a rotor head and that provides an elastic fictitious bending joint with a high lateral or transverse stiffness. Thereby the forces of the rotational moment are taken up and transmitted in connection with the high lateral or transverse stiffness of the plate element.

Figure 2:
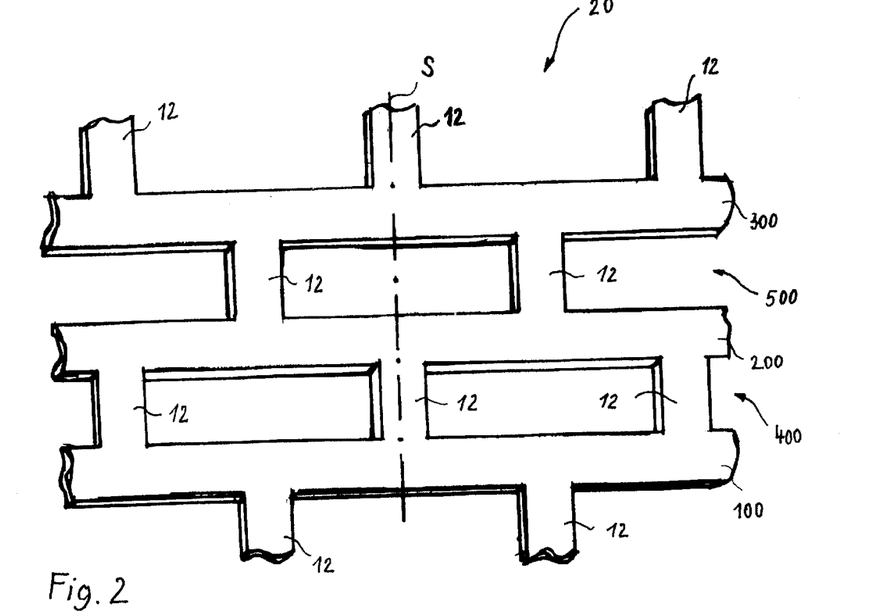
FIG. 2 is a cut-away view generally similar to that of FIG. 1, but showing a plate-shaped element according to a second embodiment.

FIG. 2 shows another possible configuration of the plate-shaped element or plate 20. Particularly, FIG. 2 shows only a small section or portion of the plate 20, which has a grid structure including, for example, three rings 100, 200 and 300. Fewer or greater than three rings are alternatively possible. The individual rings are spaced respectively apart from one another by annular gaps 400 and 500. The rings 100, 200 and 300 are connected, one to another, by individual connecting webs 12, which are each oriented perpendicularly relative to the direction of extension of the rings 100, 200 and 300.

The connecting webs 12 in the annular gap 400 are offset from, i.e. not aligned with, the connecting webs 12 arranged in the immediately next adjacent annular gap 500. Such an offset pattern is repeated for the successive rings and annular gaps. In other words, the connecting webs of the next successive annular gap (not shown in FIG. 2) are in turn offset relative to the connecting webs of the next following successive annular gap. When viewed in a general radial direction, e.g. perpendicularly relative to the longitudinal extension of the rings 100, 200 and 300, a respective connecting web is followed by the center of a rectangular gap area of the next adjacent annular gap, and thereafter follows a connecting web in the next annular gap, and thereupon again follows a rectangular gap section.

The dimensions of the plate 20 are dependent on the geometry of the rotor mast and the loads that arise in the installed condition of the plate 20. With reference to the perpendicular or radial direction S, it is apparent that the arrangement according to FIG. 2 is symmetrically configured. In comparison to the plate according to FIG. 1, the present plate according to FIG. 2 is simple and economical but achieves a relatively lower transverse thrust or shear stiffness because the forces in the rings arising from the rotational moment will apply a shear and bending load on the individual connecting webs 12.

Figure 3:
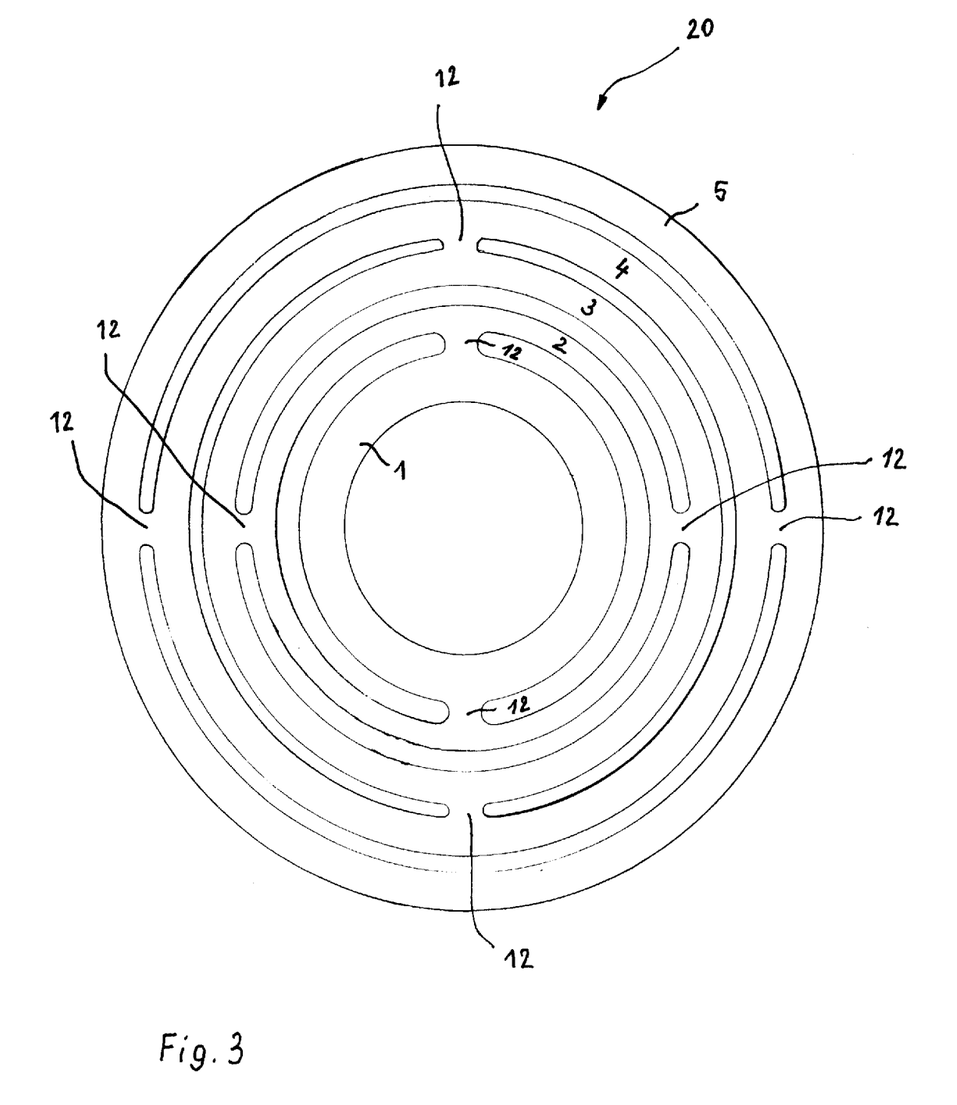
FIG. 3 is a schematic plan view of a plate-shaped element comprising circular arc-shaped rings.

FIG. 3 shows an arcuate configuration, and particularly a circular arcuate configuration of a plate 20 to form a circular ring membrane according to the invention. This plate 20 comprises five circular rings 1, 2, 3, 4 and 5 as well as connecting webs 12. The inner boundary ring 1 is connected to the intermediate ring 2 by two connecting webs 12, which are offset by 180° relative to each other. Then, two further connecting webs 12, which are offset by 180° from each other and by 90° relative to the above mentioned webs 12, connect the intermediate ring 2 to the next intermediate ring 3. This successive circumferential offset of the connecting webs by 90° in each successive annular gap between respective adjacent circular rings continues similarly up to the outermost boundary ring 5. The circular rings 1, 2, 3, 4 and 5 all lie in the same common plane. Suitable holes are provided in the circular plate 20, for example in the innermost boundary ring 1 and the outermost boundary ring 5, so that the plate 20 can be secured by bolts or the like, on the one hand to the rotor hub, and on the other hand to the rotor blade holder arrangement.

The plate 20 is fabricated of fiber reinforced composite material, for example. In order to embody the plate 20 in a fail-safe manner, the plate is constructed in a multi-layered fashion. In a standard configuration of the coupling membrane made of fiber reinforced composite materials, the layers are respectively comprised of glass fiber plies in a woven manner to form a multiply laminate. The orientation of the glass fibers in the layers varies layer-to-layer, but is always so selected to achieve an overall quasi-isotropic effect with respect to the stiffness of the finished coupling membrane. In the standard embodiment, three glass fiber layers are sufficient. For example, such a coupling membrane of fiber reinforced composite material, when seen in a cross-section, has a base layer, a middle layer, and a cover layer, which each respectively comprise glass fiber plies. Particularly, the base layer comprises ±45° glass fiber plies, the middle layer comprises 0°/90° glass fiber plies, and the cover layer comprises ±45° glass fiber plies. In order to achieve the required thickness and therewith the required strength and stiffness characteristics, the layered structure can be repeated plural times as needed. In this manner, the requirements of a homokinetic coupling membrane can be achieved.

A further variation according to the invention involves using other fibers in addition to glass fibers for fabricating the coupling membrane. In such an embodiment, the different composite materials form a so-called hybrid composite. For example, in the event of a rupture of glass fibers used in the hybrid material due to an excessive load, the additional carbon fibers provided in the hybrid material achieve a redundant fail-safe arrangement due to their higher tensile strength and the like. The cross-section of such a plate is advantageously comprised of a base layer of glass fiber plies, followed by a middle layer of carbon fiber plies, and then finished by a cover layer of glass fiber plies. The respective fiber orientations in the several layers may, for example, correspond to the fiber orientations described above for the standard configuration.

Figure 4:
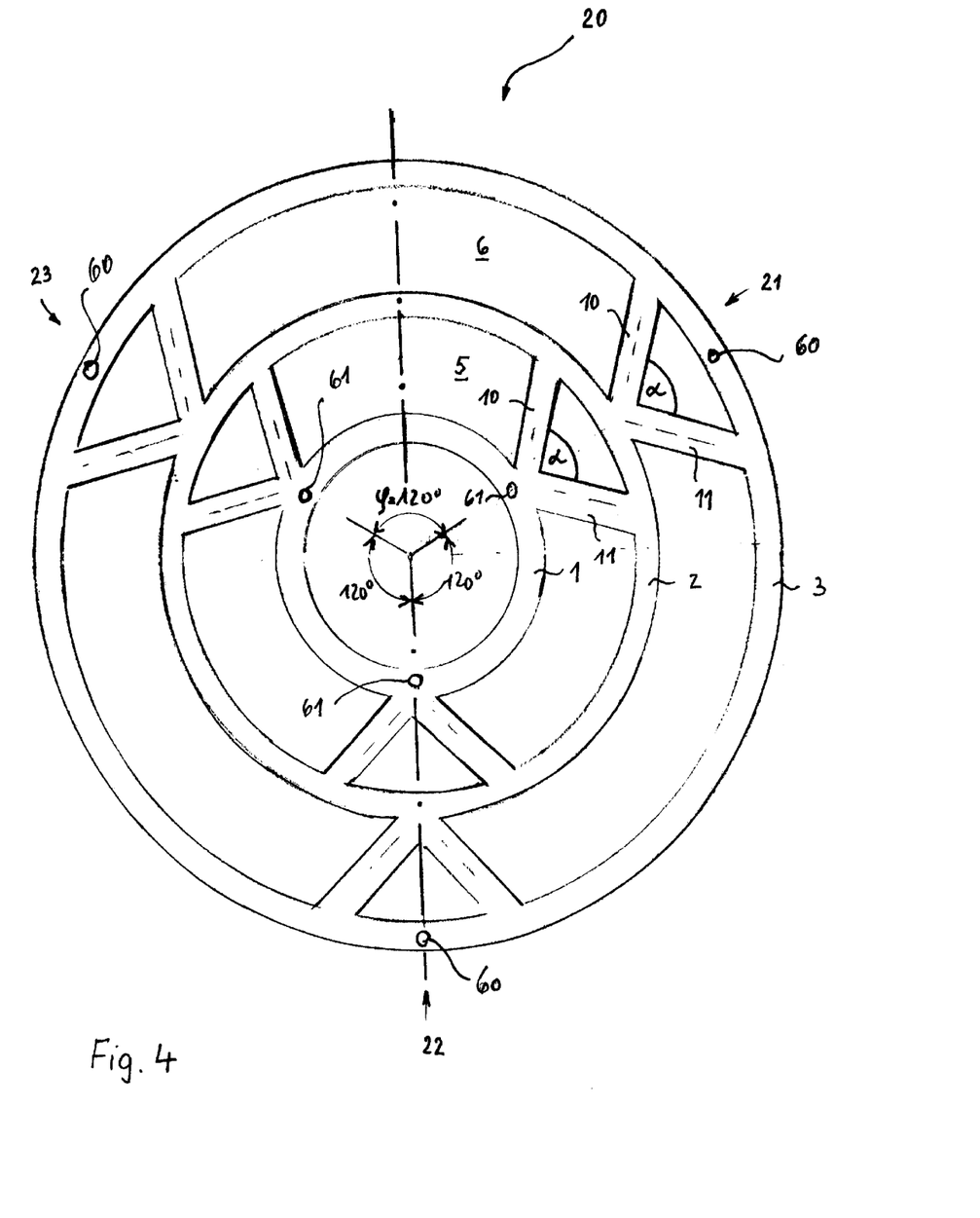
FIG. 4 is a schematic plan view of a quasi-isotropic circular plate-shaped element made up of plate segments.

FIG. 4 shows a quasi-isotropic circular plate element 20 with a two-fold triangular connection formed by connecting web pairs 10, 11 between the individual rings 1, 2 and 3. Each respective web pair 10, 11 located in one annular gap 5 is radially aligned in a row with a respective connecting web pair 10, 11 in the other annular gap 6. In other words, the vertexes of the respective web pairs 10, 11 bounding the vertex angle α are arranged on common radial lines extending from the rotation axis of the shaft and the coincident rotation axis of the plate element 20. The vertex angles α advantageously open outwardly in a radial direction away from the rotation axis.

In the above described manner, the radially aligned connecting web pairs 10, 11, thus form partial plate segments 21, 22 and 23, which are interconnected with one another by the rings 1, 2 and 3. The illustrated example of a circular plate element 20 in FIG. 4 is circumferentially divided into three plate segments, i.e. at a division angle of φ=120° between the successive radial lines on which the two-fold triangular web connections are arranged to respectively form a plate segment. Such a configuration and structure of the circular plate element 20 as a coupling membrane similarly achieves a homokinetic behavior thereof. Such a coupling membrane has a considerably improved torsional moment transmission characteristic in comparison to known arrangements in the prior art, and also requires significantly reduced material and fabrication effort for making the coupling membrane.

Three holes 61, for example, are provided uniformly spaced from one another around the inner ring 1. Suitable securing elements such as screw bolts are inserted through these holes 61 in order to secure the plate element 20 to the rotor blade holder arrangement. On the other hand, three holes 60 are provided uniformly circumferentially spaced around the outer ring 3, and are used for connecting the plate element 20 to the drive hub using suitable further securing elements such as screw bolts.

Figure 5:
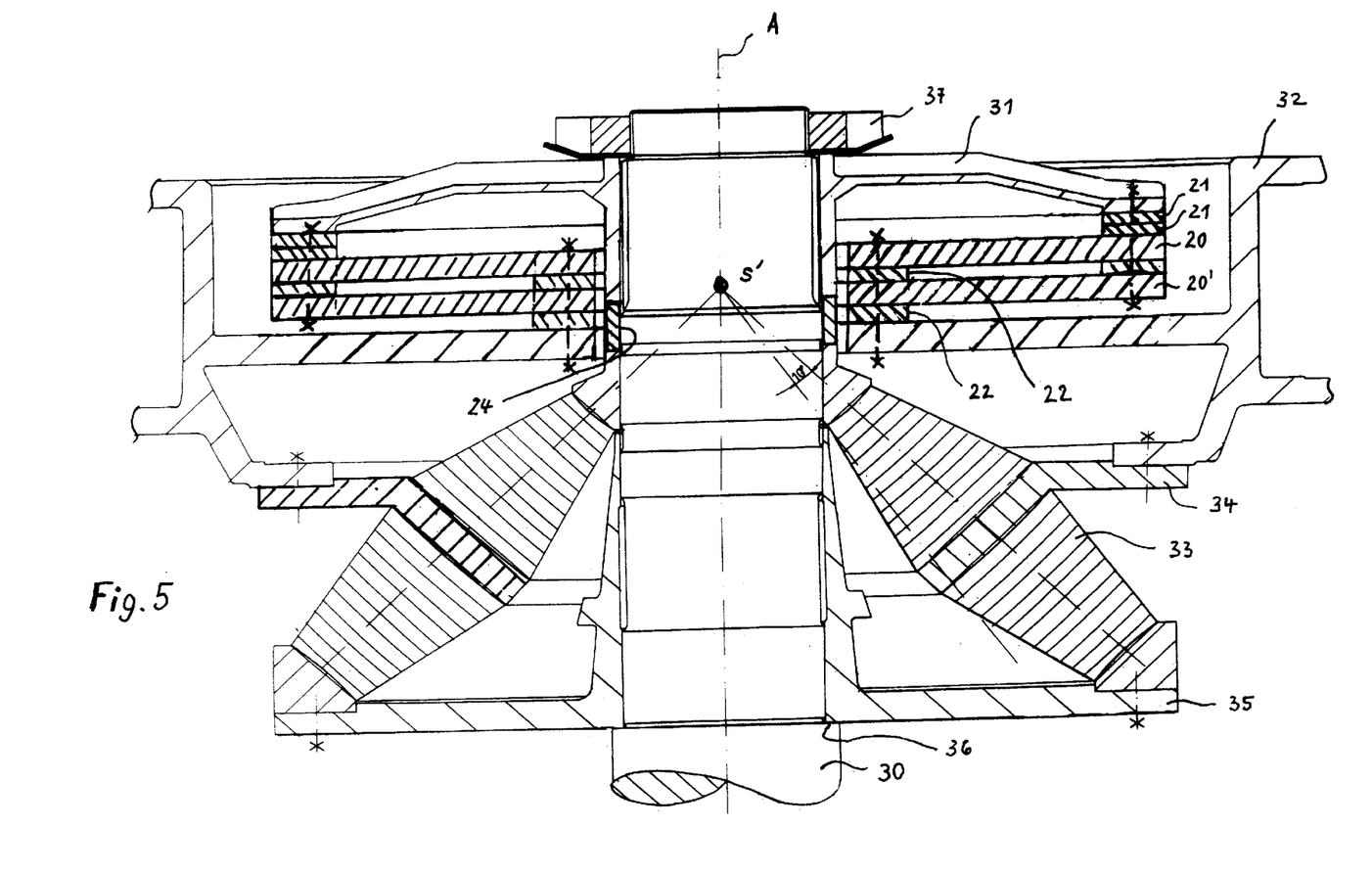
FIG. 5 is a schematic cross-sectional view of two plate-shaped elements connected together in parallel according to the invention to form a fail-safe coupling in a gimbal rotor arrangement.

FIG. 5 shows a further example embodiment for an application of the inventive plate 20 as a coupling membrane in a gimbal rotor arrangement, whereby FIG. 5 particularly shows a section or portion of the arrangement including the upper shaft of the rotor mast 30. The rotor mast can be embodied as a hollow shaft, of which the lower shaft end is arranged in the transmission of the drive arrangement. The upper shaft end of the rotor mast 30 has a somewhat tapered or reduced diameter relative to the remainder of the shaft body, i.e. a so-called stepped-down shaft. This rotor shaft carries several different components, as follows.

A drive hub 31 is connected to the head of the upper shaft end of the rotor mast 30. A plurality of coupling membranes 20, 20' are connected at their respective outer boundary rings to the drive hub 31 and to each other by suitable securing means 21 such as threaded bolts or the like and spacer shims or washers. In the present example, two coupling membranes 20, 20' are arranged parallel to each other to form a fail-safe coupling arrangement. Namely, in the event of a failure of one of the coupling membranes, the other coupling membrane will remain intact and fully functional. In any event, the number of coupling membranes that can be connected in this fashion is not limited to two. With such a lamellar parallel connection of plural coupling membranes, the yielding or bendability of the elastic rings can be increased in comparison to an equivalent single plate or membrane.

The inner boundary rings of the respective coupling membranes are all connected to each other and to the rotor blade holder arrangement 32 by means of suitable securing means such as threaded bolts or spacer shims or washers. The plural rotor blades (not shown) are connected to the rotor blade holder arrangement 32. In turn, the rotor blade holder arrangement 32 is connected to an elastomeric transverse or shear force bearing 33. This connection is achieved by a bearing holder bracket 34 that branches out from the bearing 33 and is secured to the rotor blade holder arrangement 32 by suitable securing means such as bolts or the like.

With the above arrangement, the elastomeric transverse or shear force bearing 33 is able to take up transverse or shearing forces that arise due to tilting of the rotor blade plane relative to the fictitious rotation axis A. One important characteristic of this bearing 33 is that the effective force lines of the bearing extend along lines that intersect one another at a point S' that lies on the fictitious rotation axis A. If an above-mentioned tilting motion of the rotor blade plane takes place, the coupling membranes 20, 20' will also be elastically deformed out of their respective neutral planes, but the tilting forces will be especially taken up by the bearing 33.

The bearing 33 is predominantly made of an elastomeric material, for example a stack of elastomeric layers, which may alternate with other strengthening or stiffening layers. Furthermore, the bearing 33 is arranged in, or connected to and supported by a support structure 35 that is rotatably supported between the drive hub 31 or particularly a distance spacer ring 24 and the end stop 36 of the rotor mast 30. Thereby, it is ensured that thrust forces effective in the tilting axis can be transmitted to the helicopter itself. On the other hand, the coupling membranes 20, 20' transmit the rotational drive moment while allowing the above described tilting movements. A cover plate 37 serves to rigidly clamp, secure and fix the above described components in their above described mounted arrangement on the end stop shoulder 36 of the stepped-down upper shaft end of the rotor mast 30.

Figure 6:
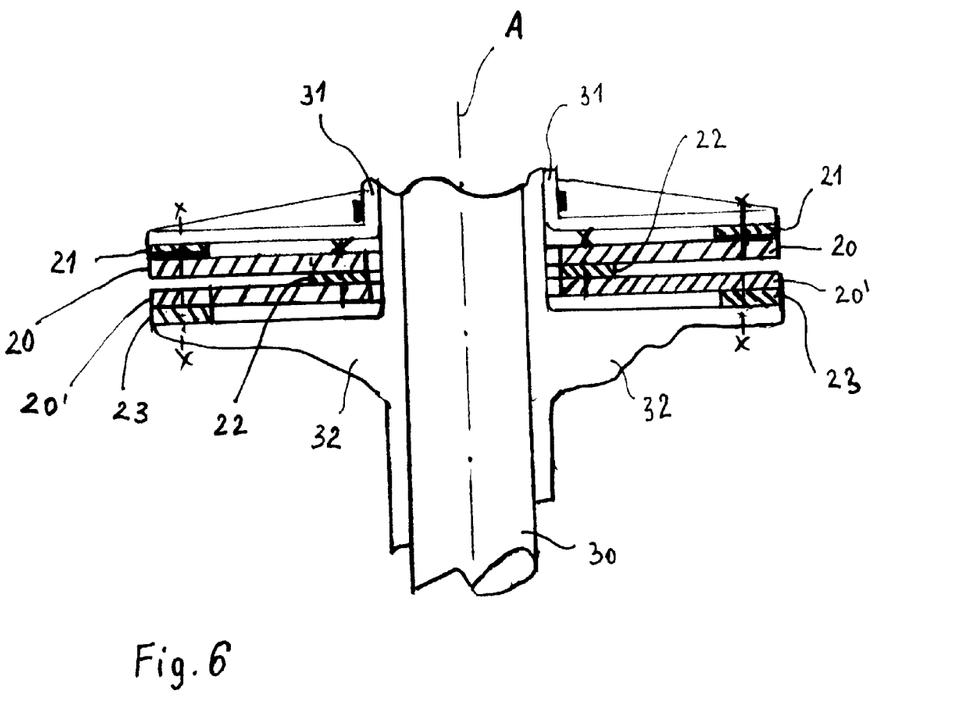
FIG. 6 is a schematic cross-sectional view of plural coupling membranes connected to each other in series in a gimbal rotor arrangement.

In order to achieve a fault and damage tolerant embodiment of the coupling membrane, a coupling element can be formed of plural plate elements or membranes arranged coaxially and connected to each other in parallel, as mentioned above, so that, in the event of a failure of one of the plate elements or membranes, the other plate element or membrane (or membranes) remain functional. Alternatively, it is possible to connect a plurality of plate elements in a sequential or series connected manner. Such an arrangement is shown in FIG. 6, whereby the several plate elements or coupling membranes 20, 20' are arranged coaxially with one another, yet are connected in series one after the other. Namely, one of the coupling membranes 20 is secured by appropriate securing means 21 to the hub 31 at the outer ring of the coupling membrane 20. The two coupling membranes 20 and 20' are connected to each other at their respective inner rings by securing means 22. Then, the outer ring of the other coupling membrane 20' is secured to the rotor blade holder arrangement 32 by securing means 23. Such an arrangement provides a greater flexibility in a compact space for allowing the tilting deflection of the rotor plane. However, this arrangement does not provide a fail-safe redundancy.

It is further possible to provide a combination of the embodiments of FIGS. 5 and 6, whereby a parallel redundancy of coupling membranes is provided, as well as a series connection of such redundant parallel membranes to achieve increased flexibility. Such an arrangement would require at least four plate elements or coupling membranes.

According to the present invention, the coupling membrane is embodied as a quasi-isotropic plate-shaped element. Particularly, this means that a uniform stiffness characteristic is ensured around the entire circumference of the coupling membrane. It is possible to use individual plate-shaped elements that are not quasi-isotropic, but it is then necessary to arrange such plate-shaped elements coaxially and respectively oriented with respect to each other so that a homokinetic behavior is achieved when the overall arrangement is assembled. Namely, the sum of such individual plate-shaped elements that have been arranged into a plate stack will achieve an overall or sum-total quasi-isotropic behavior of the stack. A uniform stiffness around the circumference of the coupling membrane in turn achieves the above mentioned homokinetic behavior.

The coupling membrane according to the invention provides a torsionally stiff coupling that nonetheless allows bending flexibility out of the plane of the plate-shaped element. Also, this coupling membrane is maintenance free and does not require any sort of grease or lubrication or the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a rotor head arrangement including a drive shaft that is rotatable about a rotation axis, a rotor hub secured on said drive shaft, a rotor blade holder, a plurality of rotor blades connected to and radially extending from said rotor blade holder, and a coupling membrane arrangement that is connected to said rotor hub and said rotor blade holder and is adapted to transmit a rotational moment between said rotor hub and said rotor blade holder, an improvement wherein said coupling membrane arrangement comprises at least one plate-shaped element, which respectively comprises a first ring, a second ring arranged concentrically around said first ring, and a plurality of first connecting webs that connect said first and second rings with each other.

2. The improvement in the rotor head arrangement according to claim 1, wherein each of said rings is a respective circularly curved ring.

3. The improvement in the rotor head arrangement according to claim 1, wherein each of said rings is a respective polygon-shaped ring made up of plural straight ring segments.

4. The improvement in the rotor head arrangement according to claim 1, wherein each one of said rings has a same width on a plane perpendicular to said rotation axis.

5. The improvement in the rotor head arrangement according to claim 1, wherein said first ring and said second ring respectively have different widths on a plane perpendicular to said rotation axis.

6. The improvement in the rotor head arrangement according to claim 1, wherein said plate-shaped element is a one-piece element integrally including said rings and said connecting webs.

7. The improvement in the rotor head arrangement according to claim 1, wherein said plate-shaped element is a flat element extending along a flat plane, with a major surface of said plate-shaped element coinciding with said flat plane.

8. The improvement in the rotor head arrangement according to claim 1, wherein said plate-shaped element has a uniform constant thickness everywhere.

9. The improvement in the rotor head arrangement according to claim 1, wherein said connecting webs are arranged as respective pairs of two of said connecting webs, wherein said two connecting webs of each said pair are arranged in a tapered V-shape relative to each other and enclosing a vertex angle ($\alpha$) therebetween.

10. The improvement in the rotor head arrangement according to claim 9, wherein
   a first annular gap is formed between said first ring and said second ring,
   said first connecting webs span across said first annular gap,
   said plate-shaped element further comprises a third ring arranged concentrically around said second ring with a second annular gap formed therebetween, and a plurality of second connecting webs that span across said second annular gap and connect said second and third rings to each other,
   said first connecting webs and said second connecting webs are all arranged as said respective pairs of said connecting webs, and
   a respective one of said pairs of said second connecting webs is arranged aligned in a row with a respective one of said pairs of said first connecting webs.

11. The improvement in the rotor head arrangement according to claim 10, including at least three of said pairs of said first connecting webs respectively arranged circumferentially displaced from one another by 120°, including at least three of said pairs of said second connecting webs respectively arranged circumferentially displaced from one another by 120°, and including three plate segments which are each respectively formed by a respective pair of said first connecting webs and a respective pair of said second connecting webs that are arranged aligned in a row with one another.

12. The improvement in the rotor head arrangement according to claim 1, wherein
   a first annular gap is formed between said first ring and said second ring,
   said first connecting webs span across said first annular gap,
   said plate-shaped element further comprises a third ring arranged concentrically around said second ring with a second annular gap formed therebetween, and a plurality of second connecting webs that span across said second annular gap and connect said second and third rings to each other, and
   said first connecting webs are respectively circumferentially offset and not aligned with said second connecting webs.

13. The improvement in the rotor head arrangement according to claim 1, wherein said at least one plate-shaped element includes a first said plate-shaped element and a second said plate-shaped element that are arranged coaxially with one another and axially spaced apart from one another, and wherein said first and second plate-shaped elements are connected with each other.

14. The improvement in the rotor head arrangement according to claim 13, wherein respective radially outer portions of said first and second plate-shaped elements are connected to each other and to said rotor hub, and respective radially inner portions of said first and second plate-shaped elements are connected to each other and to said rotor blade holder, so that said first and second plate-shaped elements are connected to each other in parallel between said rotor hub and said rotor blade holder.

15. The improvement in the rotor head arrangement according to claim 13, wherein respective radially inner portions of said first and second plate-shaped elements are connected to each other, a radially outer portion of said first plate-shaped element is connected to said rotor hub, and a radially outer portion of said second plate-shaped element is connected to said rotor blade holder, so that said first and second plate-shaped elements are connected to each other in series between said rotor hub and said rotor blade holder.

16. The improvement in the rotor head arrangement according to claim 13, wherein said first and second plate-shaped elements are each respectively not quasi-isotropic, and are stacked coaxially and connected with each other so that all of said plate-shaped elements together form a quasi-isotropic stack of said elements with an overall quasi-isotropic behavior.

17. The improvement in the rotor head arrangement according to claim 1, wherein said plate-shaped element consists of a fiber reinforced composite material hybrid structure including at least one ply of carbon fibers and at least one ply of glass fibers.

18. The improvement in the rotor head arrangement according to claim 1, wherein said rotor blade holder is a rigid member.

19. The improvement in the rotor head arrangement according to claim 1, wherein said rotor head arrangement is a helicopter gimbal rotor arrangement, further comprising flexible bearings that tiltably secure said rotor blade holder to said drive shaft, wherein respective center axis lines of said bearings intersect each other at an intersection point on said rotation axis.

* * * * *

UNITED STATES PATENT AND TRADEMARK OFFICE
CERTIFICATE OF CORRECTION

PATENT NO.    : 6,361,278 B2
DATED         : March 26, 2002
INVENTOR(S)   : Bansemir It is certified that error appears in the above-identified patent and that said Letters Patent is hereby corrected as shown below:

<u>Title page,</u>
Item [56], References Cited, U.S. PATENT DOCUMENTS, following line 1, insert the following:
-- 4,182,597    01/1980    Deerschmidt
4,345,876    08/1982    Schwarz et al.
4,352,631    10/1982    Buchs et al.
4,369,018    01/1983    Brunsch et al.
4,568,244    02/1986    Wehnert et al.
5,263,821    11/1993    Noehren et al.
6,039,538    03/2000    Bansemir --.

FOREIGN PATENT DOCUMENTS
-- PCT    WO 87 04402    07/1987 --.

Signed and Sealed this

First Day of October, 2002

Attest:

Attesting Officer

JAMES E. ROGAN
*Director of the United States Patent and Trademark Office*